2,861,322

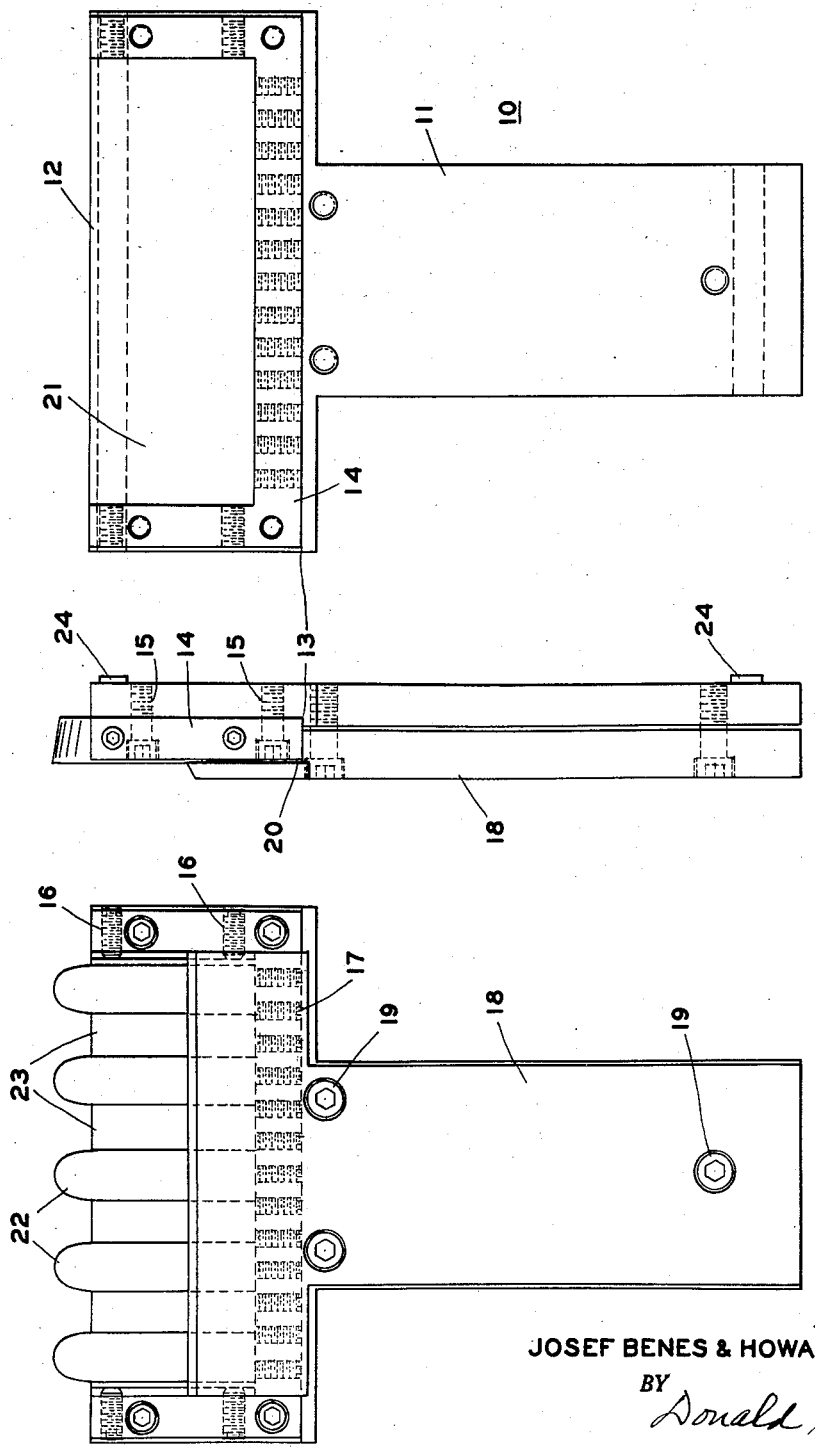

GANG LATHE TOOL

Josef Benes and Howard C. Tomasch, Garfield Heights, Ohio, assignors to United States Steel Corporation, Pittsburgh, Pa., a corporation of New Jersey Application January 5, 1955, Serial No. 479,971

1 Claim. (Cl. 29—97)

This invention relates to a lathe tool having a plurality of cutters or bits whereby a plurality of cuts may be taken simultaneously in a work piece and, in particular, to a tool with cutters which are individually adjustable and replaceable.

In certain lathe jobs such as turning grooves in the rolls of rod mills, for example, it is desirable for economy of time, to take a plurality of cuts simultaneously. A one-piece gang tool has been used for this purpose heretofore, made entirely of tool steel. Breakage of one cutter portion or tooth thereof, however, required replacement of the whole tool at considerable cost. It is accordingly the object of our invention to provide a tool including a holder having a plurality of spaced, removable bits or cutters therein, with means for individually adjusting them and a single means for clamping them in adjusted position.

A complete understanding of the invention may be obtained from the following detailed description and explanation which refer to the accompanying drawings illustrating the present preferred embodiment. In the drawings:

Figure 1 is a plan view of the tool;

Figure 2 is a side view; and

Figure 3 is a plan view of the holder with the bits and plate for clamping them removed.

Referring in detail to the drawings, our improved tool comprises flat T-shaped base plate 10 including a shank 11 and a head 12. The shank is adapted to be held by suitable securing means in cutting position on the tool rest of a lathe. The head is cut back on one face down to a line adjacent the shank, forming a step 13. A separate U-shaped member 14 has its bottom rail seated against the step, is secured to the head by screws 15 and forms a wall around the inner edge and sides of the head 12. Wall member 14 has bit-clamping screws 16 and bit-adjusting screws 17 threaded into tapped holes in the side bars and bottom rail thereof respectively.

A T-shaped cover plate 18 is adapted to be secured flatwise to the base plate in overlying position by screws 19. The cover plate has a body portion and a cross-bar transverse thereto. The inner face of the cross bar of the cover plate is cut back as at 20 forming a step so that when the cover plate is in place on the base plate, they together with wall member 14 define a pocket 21 extending substantially across the width of head 12 and open at the outer end. Pocket 21 is adapted to accommodate a plurality of cutter bits 22 disposed side-by-side with spacer bars 23 therebetween.

It will be understood that the cut-back or step 20 of the cover plate is so dimensioned, relative to the thickness of the bits 22, that the latter will be engaged by the cross bar of the cover plate before the shank portion thereof engages the shank 11 of the base plate as screws 19 are turned home. Screws 17 are turned to adjust the bits longitudinally of the tool before clamping screws 16 are tightened. The cover plate, when applied and drawn tight, firmly holds the cutters in pocket 21.

Transverse bearing ribs 24 are formed on the bottom of base plate 10 to engage a tool rest on the lathe and the shank 11 and shank portion 18 are adapted to be engaged by suitable securing means to hold them in operative position thereon relative to a work piece such as a rod-mill roll.

It will be apparent from the foregoing that the invention provides a simple, inexpensive holder having a pocket adapted to mount a plurality of cutter bits for individual adjustment or replacement. The base plate and cover plate may be made of ordinary carbon steel. Since the bits are the only parts which have to be made of tool steel the original cost of the tool is relatively low. On breakage of a bit, furthermore, it is necessary to replace only that one. The cost of so doing is low because of the small size of the part.

Although we have disclosed herein the preferred embodiment of our invention, we intend to cover as well any change or modification therein which may be made without departing from the spirit and scope of the invention.

We claim:

A lathe tool comprising a T-shaped base plate including a shank and a cross-bar, said cross-bar having a step on one face extending normal to said shank, a separate U-shaped wall member including a straight bottom rail, said wall member being disposed flatwise against said face with said bottom rail seated against said step, a plurality of cutting bits disposed flatwise against said face within said wall member, and a T-shaped cover plate including a shank and a cross-bar secured flatwise to said base plate, the cross-bar of the cover plate extending partly over said bits and having a step normal to the shank of the cover plate, said last mentioned step abutting said bottom rail and the shank of the cover plate being alined with the shank of the base plate.

References Cited in the file of this patent

UNITED STATES PATENTS

| 108,943 | Smith | Nov. 1, 1870 |
| 1,013,129 | Clarke | Jan. 2, 1912 |
| 1,342,031 | Skibinski | June 1, 1920 |
| 1,955,357 | Christman | Apr. 17, 1934 |
| 2,289,155 | Weidauer | July 7, 1942 |
| 2,363,160 | Sundstrom | Nov. 21, 1944 |

FOREIGN PATENTS

| 13,704 | Great Britain | June 11, 1909 |
| 551,035 | Great Britain | Feb. 4, 1943 |
| 700,971 | Germany | Dec. 5, 1940 |
| 931,476 | France | Feb. 24, 1948 |